June 24, 1952  W. M. TOMKINS ET AL  2,601,645
AGITATING PRESSURE COOKER
Filed Dec. 30, 1947  12 Sheets-Sheet 4
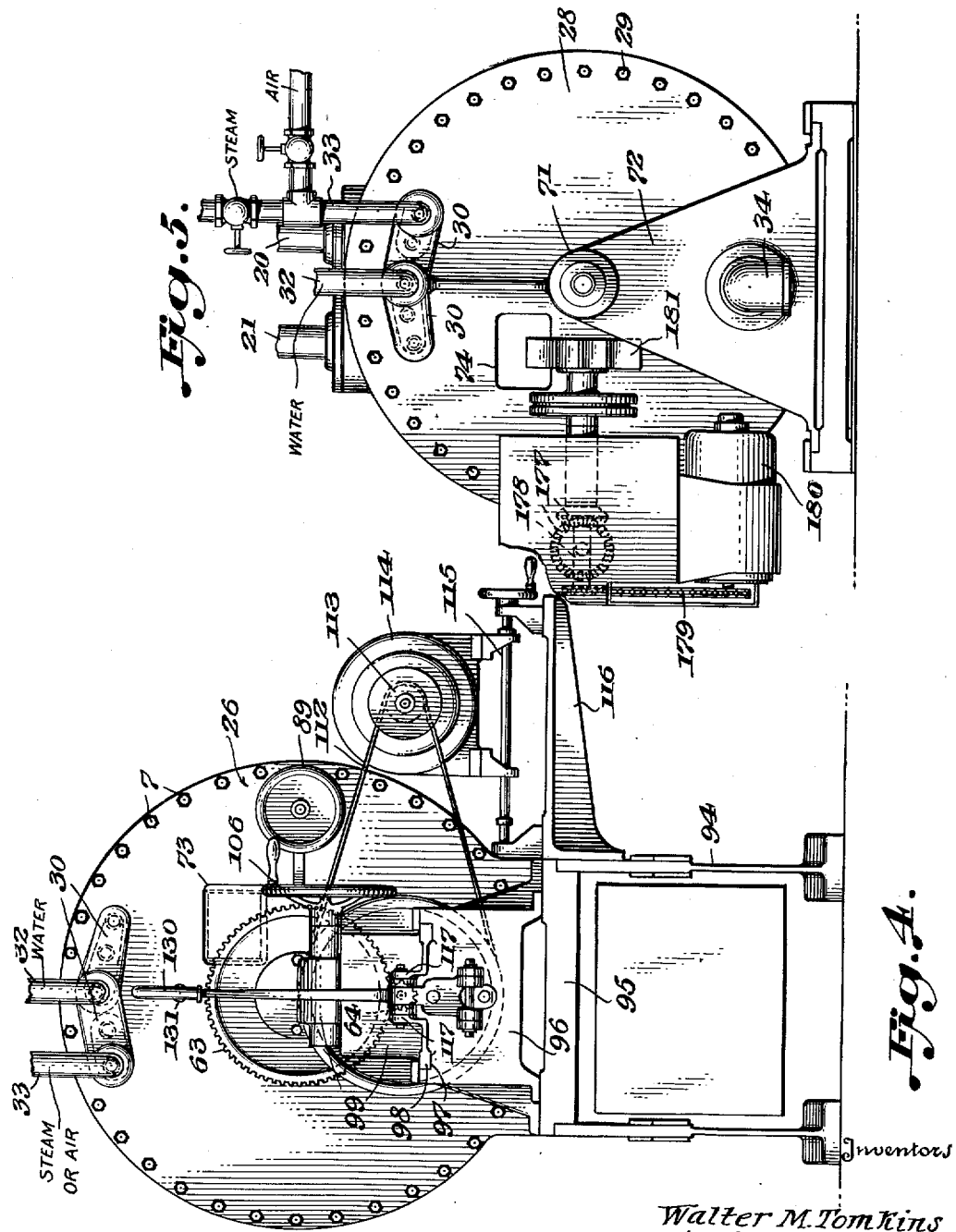
Inventors
Walter M. Tomkins
Carl E. Magnus
By Mason, Porter, Diller & Stewart
Attorneys.

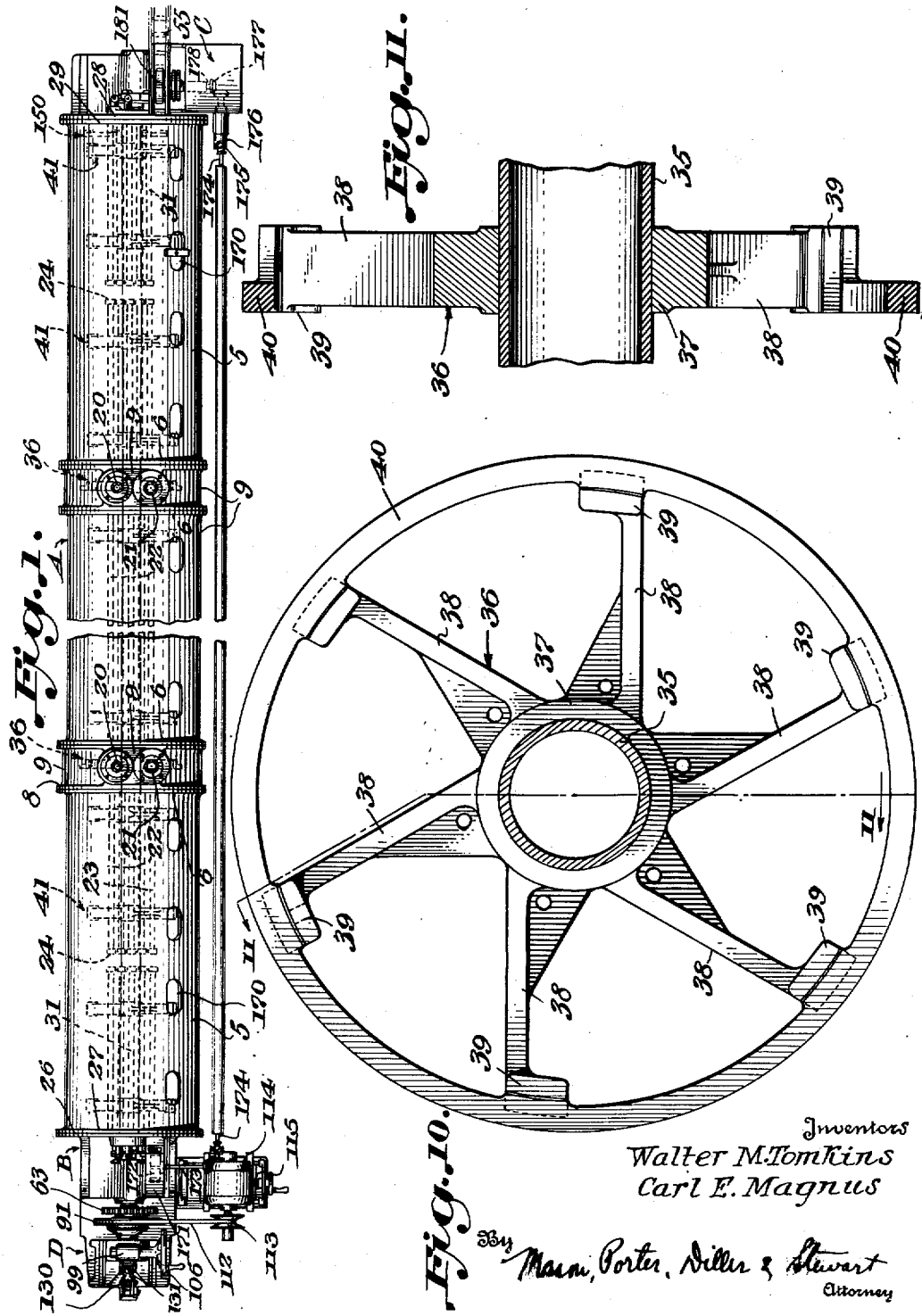

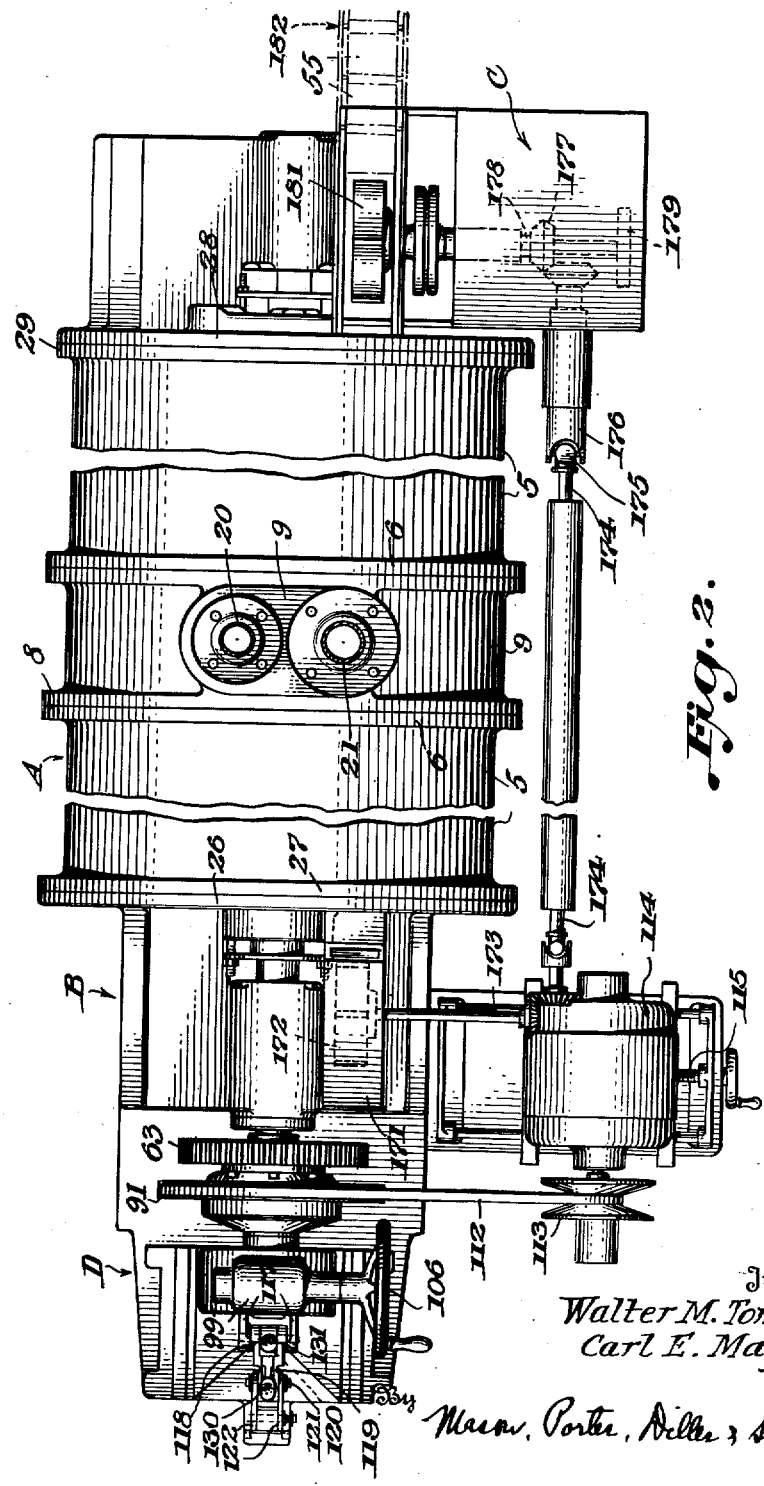

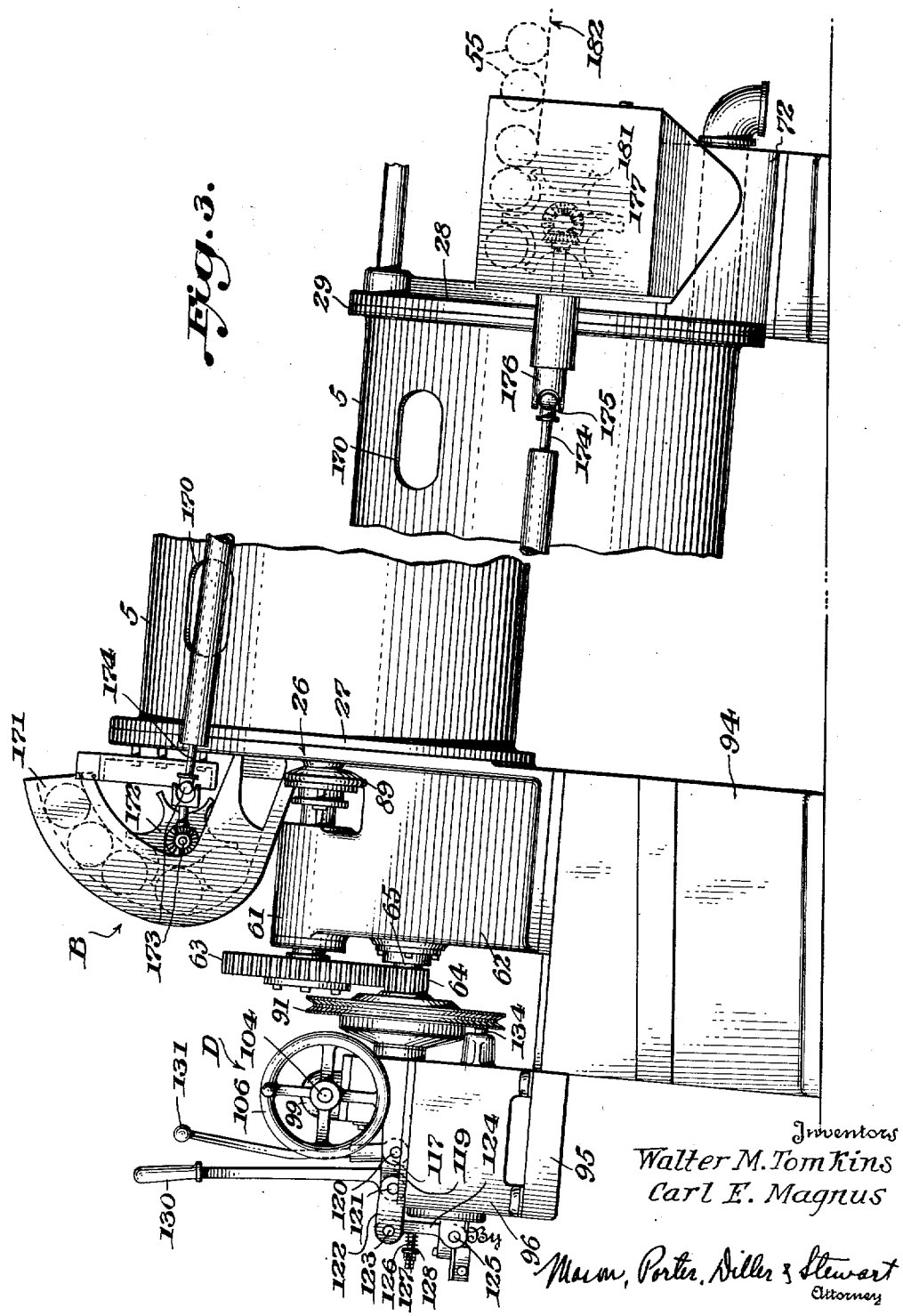

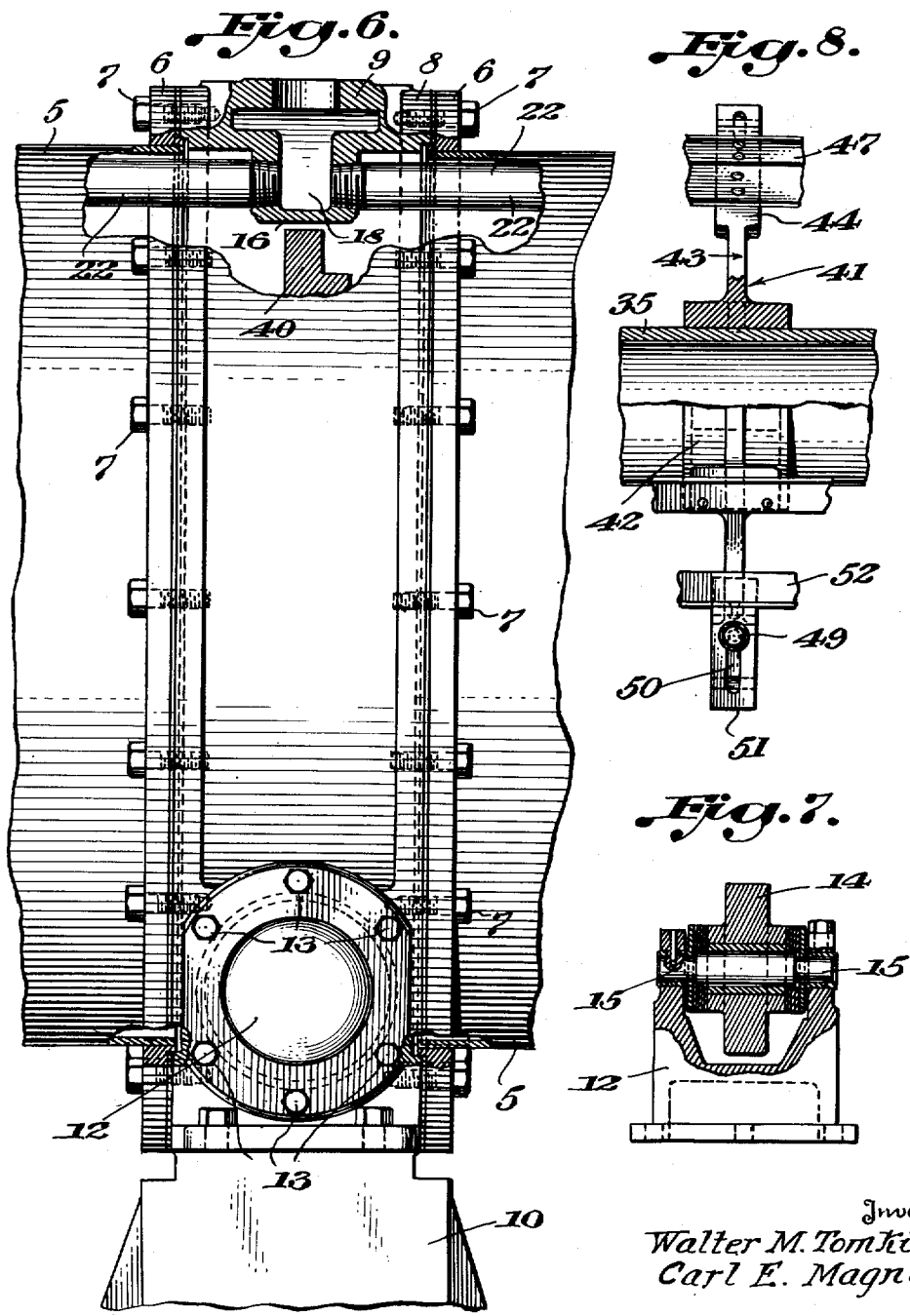

June 24, 1952 W. M. TOMKINS ET AL 2,601,645
AGITATING PRESSURE COOKER
Filed Dec. 30, 1947 12 Sheets-Sheet 7

Inventors
Walter M. Tomkins
Carl E. Magnus

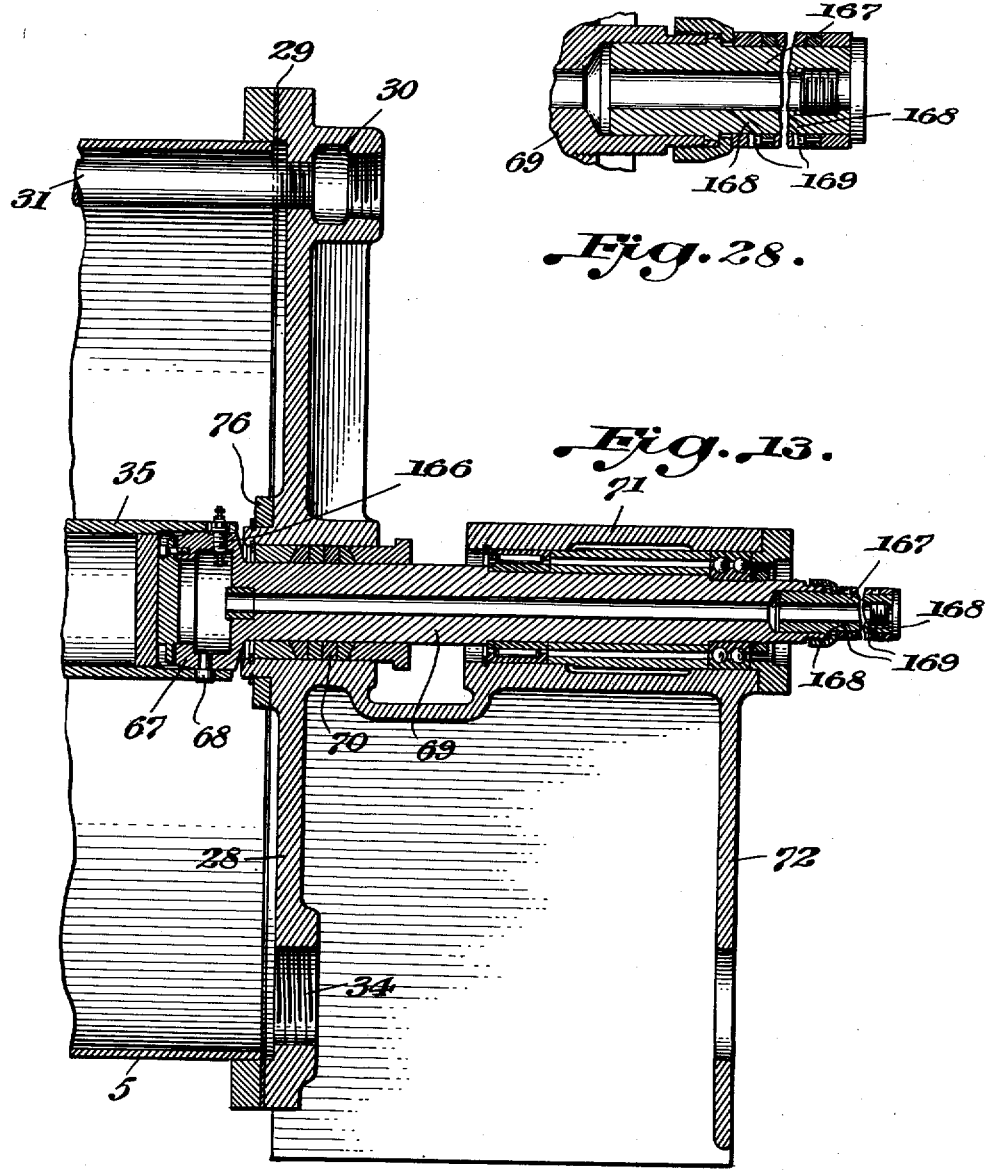

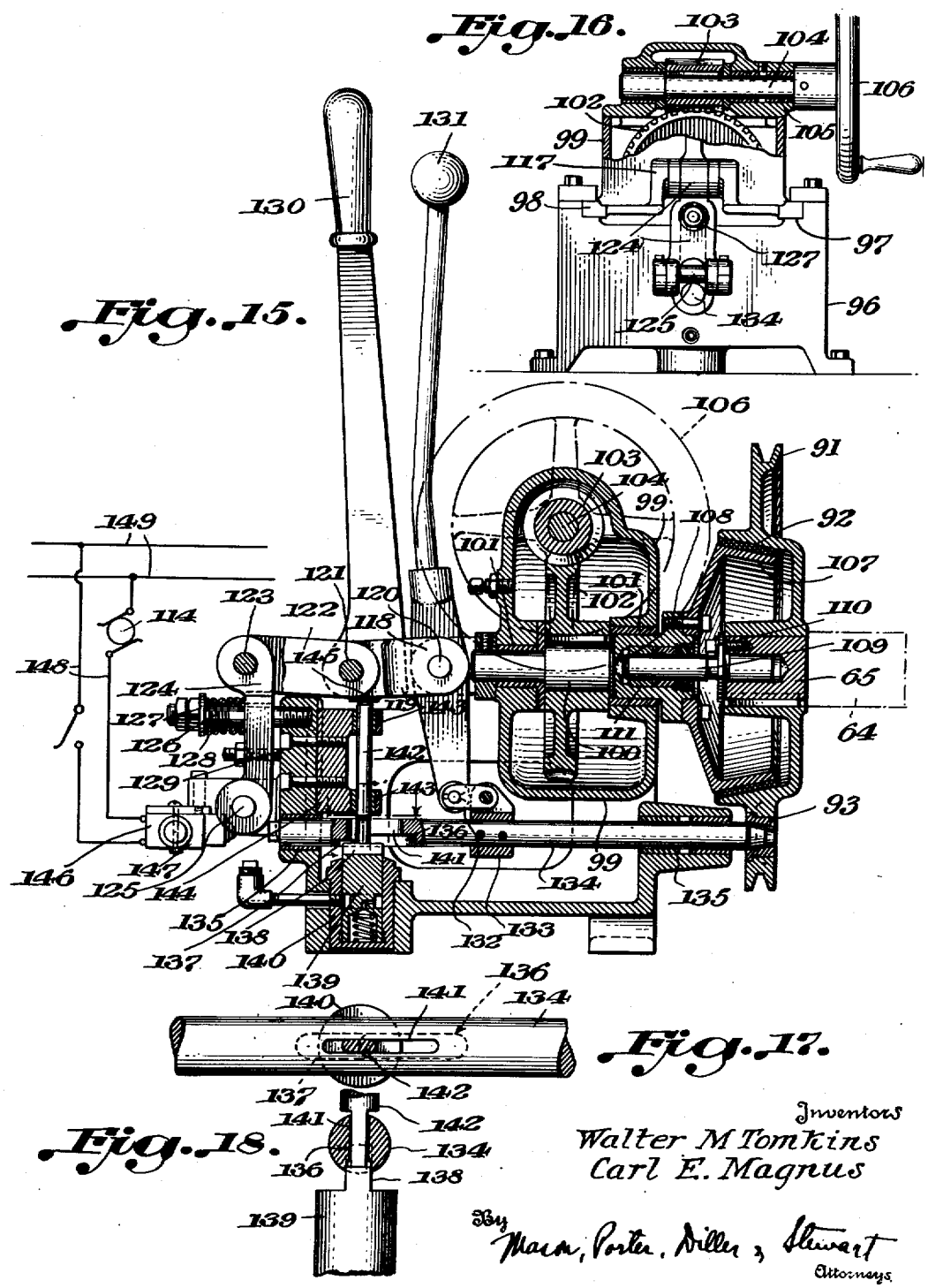

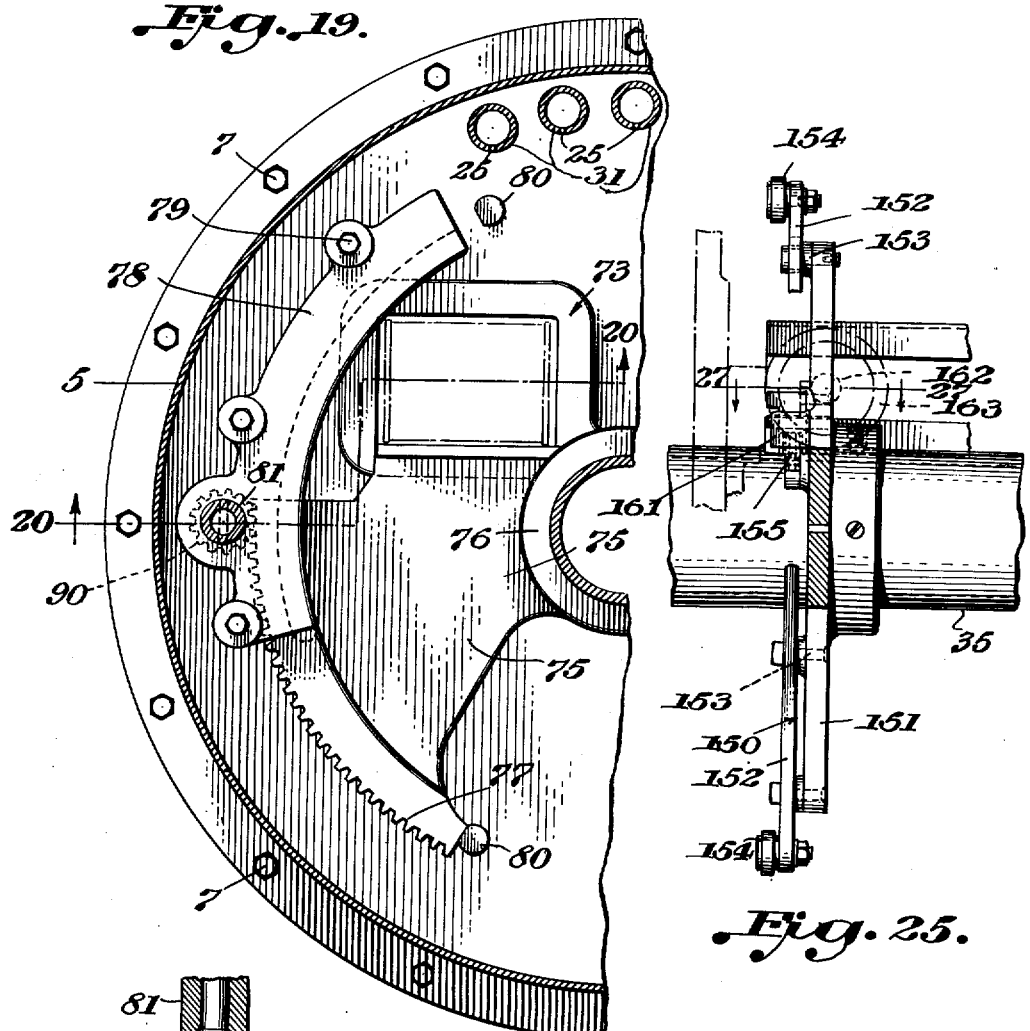
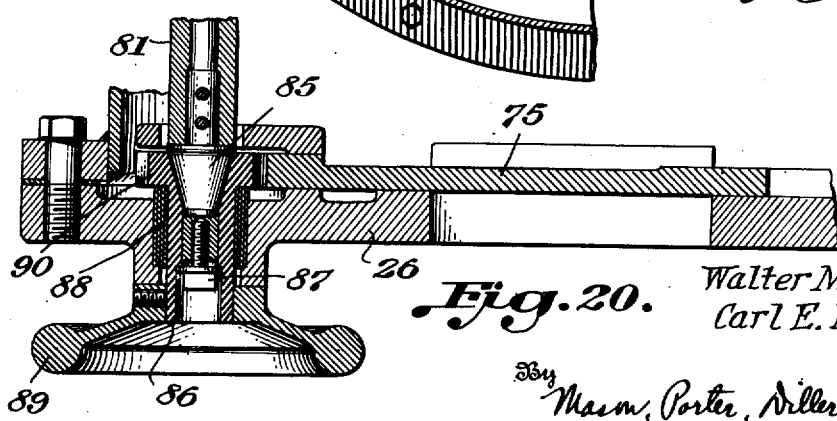

Inventors
Walter M. Tomkins
Carl E. Magnus.

June 24, 1952  W. M. TOMKINS ET AL  2,601,645
AGITATING PRESSURE COOKER
Filed Dec. 30, 1947  12 Sheets-Sheet 12

Inventors
Walter M. Tomkins
Carl E. Magnus
By Mason, Porter, Diller & Stewart
Attorneys.

UNITED STATES PATENT OFFICE 2,601,645

AGITATING PRESSURE COOKER

Walter M. Tomkins, Hinsdale, and Carl E. Magnus, Chicago, Ill., assignors to Continental Can Company, Inc., New York, N. Y., a corporation of New York Application December 30, 1947, Serial No. 794,760

33 Claims. (Cl. 99—364)

The invention relates to new and useful improvements in apparatus for processing food products in sealed cans, and it primarily seeks to provide a novel apparatus in which the cans may be subjected to the desired heating, cooling and pressure conditions, into which and from which the cans may be rapidly and conveniently fed, and in which the cans may be moved about during processing in a manner for assuring that said processing will be rapidly and thoroughly carried out.

The usual method of processing food products sealed in metal cans is to subject the external surface of the cans to a heating medium for transfer of heat to the food product, and to a cooling medium for removing the heat therefrom. A suitable heating medium is steam, and a suitable cooling medium is cold water. Various products are processed in this manner, liquid, semi-liquids, or solids in liquid, and examples are soups, evaporated milk and fruits in syrup, or vegetables in brine, and also tightly packed solids having fluids in the interstices of the mass, such as whole grain corn, peas, asparagus and the like.

One of the important factors in processing food products in sealed cans is the time consumed to transfer heat from the walls of the can to the center thereof so that the entire food product will be uniformly heated to or near the temperature of the treating media. The quicker this is accomplished, the better will be the quality and nutritive value of the food product. The same is true in the cooling of the product after heat treatment. Furthermore, any shortening of the time of heat transfer to and from the center of the can shortens the overall processing time and is of economical value, besides producing a better quality of processed food product. It is also known that by bringing about movement of the mobile portion of the contents in a sealed can in a manner for causing said portions to move relative to the walls of the can and provide more or less turbulence in the can, the transfer of heat from the walls of the can to and from the entire contents can be greatly facilitated.

An object of the invention is to provide a novel apparatus in which the cans may be subjected to the aforesaid heat exchange and product movement over the desired processing interval.

In copending application for U. S. Letters Patent, Serial Number 710,472, filed November 18, 1946, by Laverne E. Clifcorn, Gordon T. Peterson and John M. Boyd, and since issued as Patent No. 2,517,542, there is disclosed a method of processing food products in cans wherein a space is provided permitting movement of the mobile contents. According to this method the can is rotated in a manner setting up centrifugal force tending to move the entire mass in the same general direction in the can, and the centrifugal force during each rotation of the can operates during a portion of the rotation to augment the force of gravity and during another portion of the rotation to oppose the action of gravity, thereby to bring about the desired movement of the mobile contents in the can. It is an object of the present invention to provide a novel apparatus in which the cans may be suitably held in place and rotated so as to practice said method.

An object of the invention is to provide apparatus of the character stated in which the can may be held in position for being subjected to the desired heat exchanging medium and rotated about a generally horizontal axis located externally of the can.

Another object of the invention is to provide an apparatus of the character stated in which a multiple of cans may be held with their longitudinal axes in the same general plane perpendicular to an axis of rotation externally of all of said cans and rotated about said axis in a heat exchange medium.

Another object of the invention is to provide an apparatus of the character stated in which the means for supporting and rotating the cans in the heat exchanging medium comprises a rotor having longitudinally disposed can runways placed thereabout in which each can lies with its longitudinal axis disposed tangentially with respect to an imaginary circle concentric to the rotor axis and in a plane perpendicular to said rotor axis.

Another object of the invention is to provide an apparatus of the character stated in which the rotor is mounted on an incline within a retort, novel means being included for controlling the feeding of cans into and from the retort and onto and from the rotor runways, and also means for manually indexing the rotor to properly place the runways for receiving and discharging cans, and means for imparting rotation to the rotor at variable speeds.

Another object of the invention is to provide an apparatus of the character stated in which there are included means for locking the rotor in positions to which it is indexed, and means for preventing operation of the rotor rotating means whenever the locking means has not been moved to its full release position.

Another object of the invention is to provide an apparatus of the character stated in which the rotor indexing means includes a manually shifted cone clutch, and in which is included means for preventing too sudden engagement of the clutch in effecting a braking of the turning rotor.

Another object of the invention is to provide an apparatus of the character stated in which there are included means for selectively directing steam, air and water into the retort to provide for the desired heat exchange action and pressure conditions.

Still another object of the invention is to provide in apparatus of the character stated novel means for enabling the mounting and attachment of thermocouples by which processing conditions within cans in the retort may be tested.

With the above and other objects in view that will hereinafter appear, the nature of the invention will be more clearly understood by reference to the following detailed description, the appended claims, and the several views illustrated in the accompanying drawings.

In the drawings:

Figure 1 is a somewhat diagrammatic plan view illustrating a cooking retort embodying the invention.

Figure 2 is an enlarged plan view illustrating the retort shown in Figure 1, parts being broken away.

Figure 3 is an enlarged right side elevation illustrating the retort shown in Figure 1, parts being broken away.

Figure 4 is a left end elevation.

Figure 5 is a right end elevation.

Figure 6 is a side elevation illustrating one of the retort casing section connectors, parts being broken away and in section.

Figure 7 is a detail side elevation and part horizontal sectional view illustrating one of the plug mounted rotor supporting rollers.

Figure 8 is a fragmentary side elevation and part longitudinal section illustrating one of the rotor can runway supporting spiders.

Figure 10 is a detail vertical cross section showing one of the rotor supporting ring mounting spiders.

Figure 11 is a vertical cross section taken on the line 11—11 on Figure 10.

Figure 13 is a fragmentary vertical longitudinal section showing the shaft section mounting in the discharge end header.

Figure 14 is a detail side elevation and part longitudinal section showing one of the water, air or steam pipes.

Figure 15 is a fragmentary vertical longitudinal section showing the rotor drive and index means control devices.

Figure 16 is an enlarged fragmentary end elevation illustrating the manually operated indexing devices, parts being broken away and in section.

Figure 17 is a fragmentary plan view and part horizontal section showing the relation of the cushioning pin and the locking rod of the indexing means.

Figure 18 is a vertical cross section showing the parts illustrated in Figure 17.

Figure 19 is a fragmentary vertical cross sectional view illustrating the shiftable closure door at the receiving end of the retort.

Figure 20 is a horizontal section taken on the line 20—20 on Figure 19, the door being shown closed.

Figure 25 is a fragmentary longitudinal section taken on the line 25—25 on Figure 24 and illustrating the spider shown in Figure 24.

Figure 28 is an enlarged fragmentary longitudinal section illustrating the hollow shaft extension on which the contact rings are mounted for association with testing devices.

In the practical development of the invention, there is provided a cooker retort generally designated A and which is supported on an incline as shown in Figure 3. The retort casing houses a rotor composed of a multiple of can runways or tracks whereon the cans are supported in rows, being fed thereinto in a novel manner by infeeding means generally designated B, and out therefrom by outfeeding means generally designated C. The rotor is indexed in order to successively present its runways to receive and discharge the individual rows of cans, and is rotated during the processing of the cans by the indexing and rotating means generally designated D.

The retort generally designated A is composed of a multiple of cylindriform casings 5, each having an attaching flange 6 welded or otherwise secured to each end thereof. The individual casing sections are secured as at 7 to the flanges 8 of intermediate connector members 9, said members being best illustrated in Figures 1, 2, 6 and 9 of the drawings.

Figure 9:
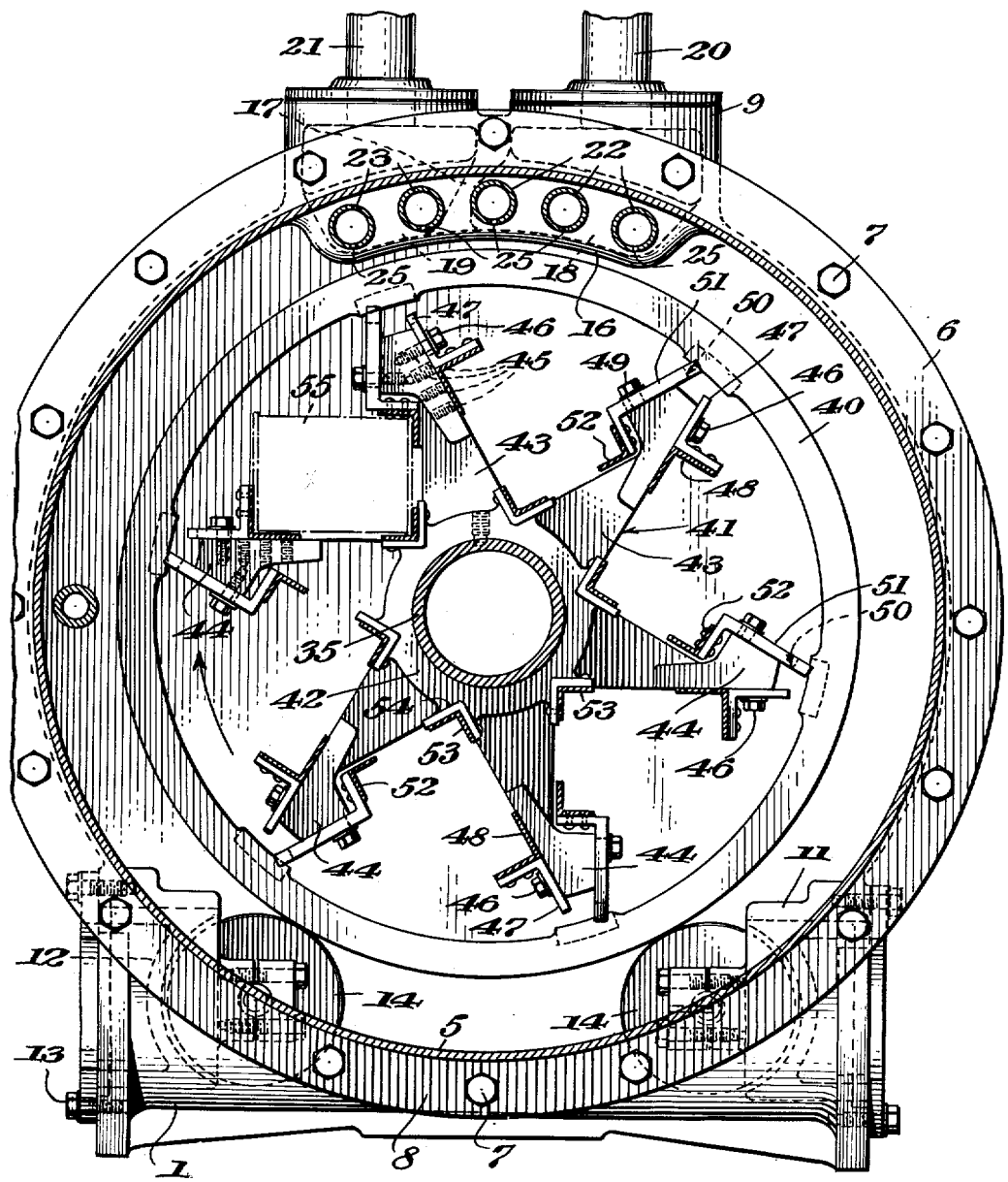
Figure 9 is a vertical cross section taken through the retort at a position adjacent to and looking toward one of the casing section connectors, one of the can runway spiders shown in Figure 8 being illustrated in face view.

The intermediate connector members 9 are supported on pedestals 10, and each member 9 is equipped with two axially aligned plug bearings 11, as shown in Figures 6 and 9. In each bearing 11 a plug 12 is removably mounted, being flange secured as at 13, and each plug carries a supporting roller 14 having trunnion bearing as at 15 in the plug. One of the roller supporting plugs is shown in detail in Figure 7.

Each of the connector members 9 is provided with an inwardly projecting hollow body 16 at the top thereof, said body being divided by a wall 17 into a water chamber 18 and a steam or air chamber 19. A duct or pipe line 20 connects with the chamber 18, and a duct or pipe line 21 connects with the chamber 19. A plurality of water pipes 22 are secured at one end to the body 16 so as to communicate with the water space 18, and a plurality of steam or air pipes 23 are connected at one end with the body 16 to communicate with the steam or air chamber 19. The pipes 22 and 23 extend in opposite directions from the respective connector member 9 along the top portion of the retort in the manner clearly illustrated in Figures 1, 6 and 9 of the drawings, and the pipes projecting from the respective connector members approximate each other at their extended ends away from water and steam or air connections and are capped as at 24. All of the pipes 22 and 23 are equipped with inwardly directed orifices 25 through which the water, the steam or the air may be directed into the interior of the retort during the processing of cans. One of the orificed pipes is shown in detail in Figure 14.

An end closure or header 26 is flange secured as at 27 to the respective casing section at the receiving end of the retort, and a similar end closure or header 28 is flange secured as at 29 to the respective casing section at the discharge end of the retort. The headers are best illustrated in Figures 3, 4, 5, 12 and 13 of the drawings. Each header is provided with water, steam or air chambering 30 to correspond to the chambering in the several connector members 9 and serves to support orificed water, steam or air pipes 31 similar to the pipes supported by said connector members. A water pipe line or duct 32 and a steam or air pipe line or duct 33 connects with each header in the manner illustrated in Figures 4 and 5, and it will be apparent by reason of the provision of the several pipes, chambers and supply ducts or pipes 20, 21, 32 and 33 that it is possible to selectively supply steam or air or water to the interior of the retort during the processing of cans. Provision for suitable drainage is made through the drainage connection 34 clearly illustrated in Figures 3, 5 and 13 of the drawings.

The can supporting rotor includes a hollow center shaft 35 whereon is mounted a multiple of supporting spiders 36, one such spider being provided for and within each of the casing section connector members 9. See Figures 1, 10 and 11 of the drawings. Each of the spiders 36 comprises a hub ring 37 secured about the shaft 35, and six outwardly extending arms 38 each of which is equipped with a supporting pad 39 at its outer end. The supporting pads 39 are secured to a support ring 40 which is of suitable diameter for properly resting upon and rolling on the associated pair of rollers 14 in the manner clearly illustrated in Figures 9, 10 and 11. It will be apparent that with the intermediate support provided by the spiders 36 and rings 40 within the casing section connectors 9 the rotor will be suitably supported intermediately of its ends so that it can be rotated without vibration or whipping.

It will be apparent by reference to Figure 1 that a plurality of can runway supporting spiders 41 are mounted on the center shaft 35 in equidistantly spaced relation intermediately of the support rings 40 and between each end header 26 or 28 and the next adjacent connector member 9 or support ring 40.

Each of the intermediate spiders generally designated 41 comprises a hub ring 42 which is secured upon the center shaft 35, and six outwardly extending arms 43, each of which is equipped with an enlargement or pad 44 at its outer end in the manner clearly illustrated in Figures 8 and 9 of the drawings. Each of the pads 44 has the face thereof directed in the direction of rotation of the rotor provided with a plurality of selective taps 45 intended to selectively receive a screw 46 for adjustably supporting an L-piece 47 to which one leg of an angle track 48 is secured. The face of each pad 44 directed away from the direction of rotation of the rotor is tapped to receive a screw 49 which passes through a longitudinal slot 50 in an L-piece 51 to which one leg of an angle track 52 is secured. The adjustably mounted angle tracks 48 and 52 cooperate with a third angle track 53 which is fixedly secured to a supporting crotch 54 provided on the hub 42. Each set of three tracks 48, 52 and 53 comprises a single runway in which to receive a row of cans. The cans are indicated at 55, and it will be noted by reference to Figure 9 of the drawings that six such runways are arranged in equidistantly spaced relation about the center shaft 35 in position for supporting the individual cans with their longitudinal axes disposed in tangential relation to an imaginary circle concentric to the axis of the shaft 35. It will be apparent also that by adjusting the position of the L-pieces 51 by employment of the slot and screw equipments 50, 49, and by adjustment of the L-pieces 47 by selective mounting of the screws 46 in the taps 45, the runways may be adjusted to properly receive and hold cans of different lengths and diameters.

Figure 12:
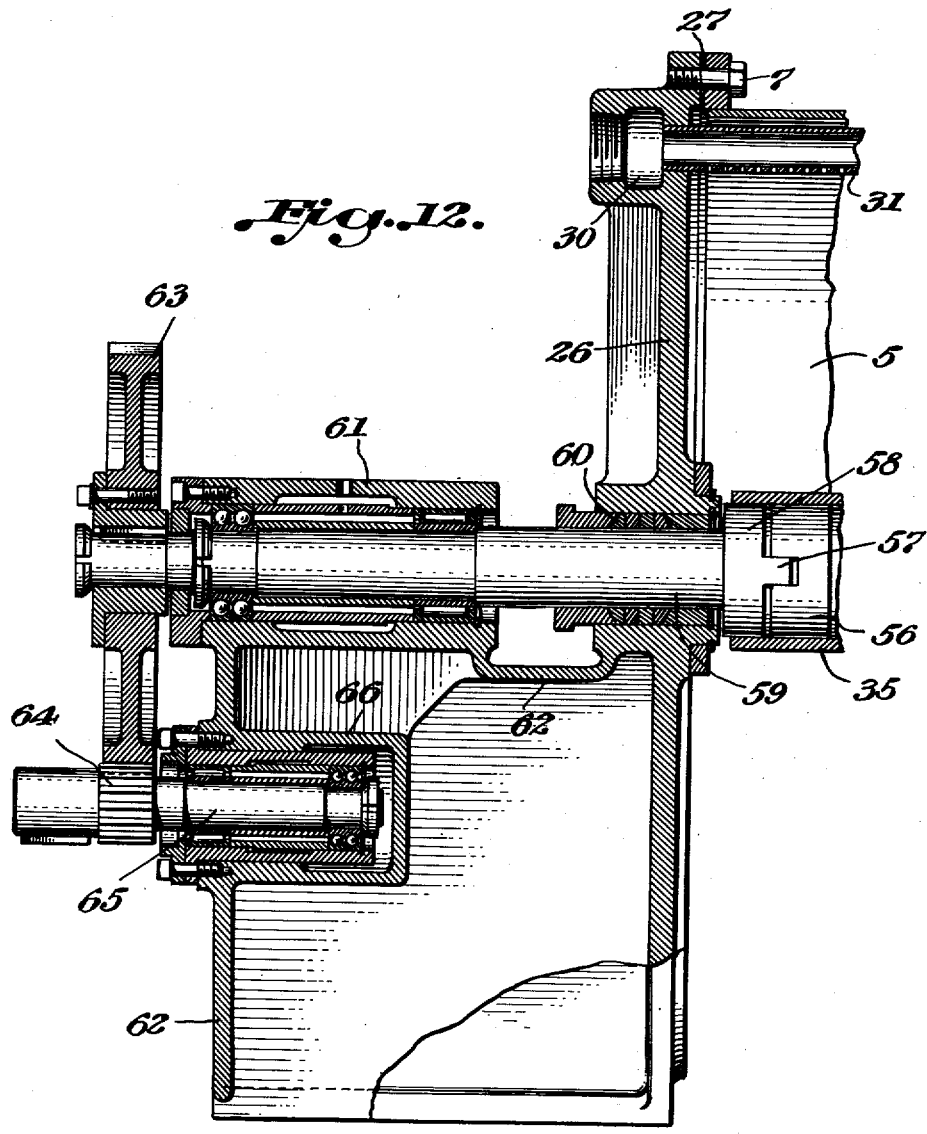
Figure 12 is a fragmentary vertical longitudinal section showing the shaft section mounting in the receiving end header.
Figure 21:
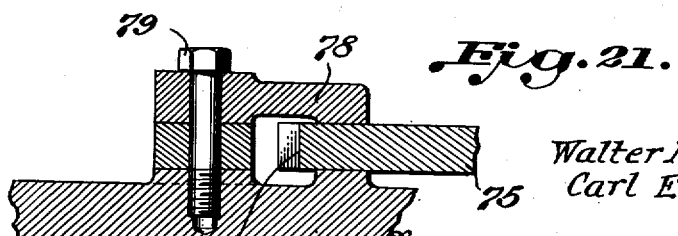
Figure 21 is a fragmentary cross section illustrating the mounting of one of the door guides or retainer arcs.

It will be apparent by reference to Figure 12 that a plug 56 is secured in the end of the hollow shaft 35 adjacent the header 26. The plug is grooved to receive the tongue 57 projecting from the driver head 58 carried by the shaft section 59 which passes through a gland 60 in said header and is rotatably mounted in a bearing 61 provided in the support extension 62 with which the header is equipped. The shaft section 59 has a large spur gear 63 secured thereon, and the spur gear is adapted to be driven by a meshing pinion 64 which is mounted on the shaft section 65 which is rotatably supported in the bearing 66 also provided on the support extension 62. The means for imparting rotation to the shaft section 65 will be described hereinafter.

At its other end, the hollow shaft 35 fits over a hollow head 67 in the manner clearly illustrated in Figure 13. The head 67 has a driving pin connection at 68 with the hollow shaft 35 and is carried by a hollow shaft section 69. The shaft section 69 passes through a gland 70 in the discharge end header 28 and is rotatably supported in a bearing 71 provided in the support extension 72 with which the header 28 is equipped. It will be apparent by reference to Figures 4, 19 and 20 that an inlet door or opening 73 is provided in the header 26 through which cans may be fed onto the selectively presented runways of the rotor. It will also be apparent by reference to Figures 5 and 22 of the drawings that an outlet door opening 74 is similarly provided in the header 28 through which the can rows may be discharged from the sequentially presented runways after the processing of cans has been completed. Each door or opening 73 or 74 is controlled by a swingably mounted door 75 swingably mounted as at 76 on the respective end of the hollow center shaft 35 against the respective header 26 or 28. See also Figures 12 and 13. Each door 75 has an arcuate rack 77 attached thereto, said racks bearing concentric relation to the rotor center and being movable between the adjacent faces of the respective header 26 or 28 and a guide or retainer arc 78 which is secured as at 79 to the respective header in the manner best illustrated in Figures 19, 20, 21 and 22 of the drawings.

Figure 22:
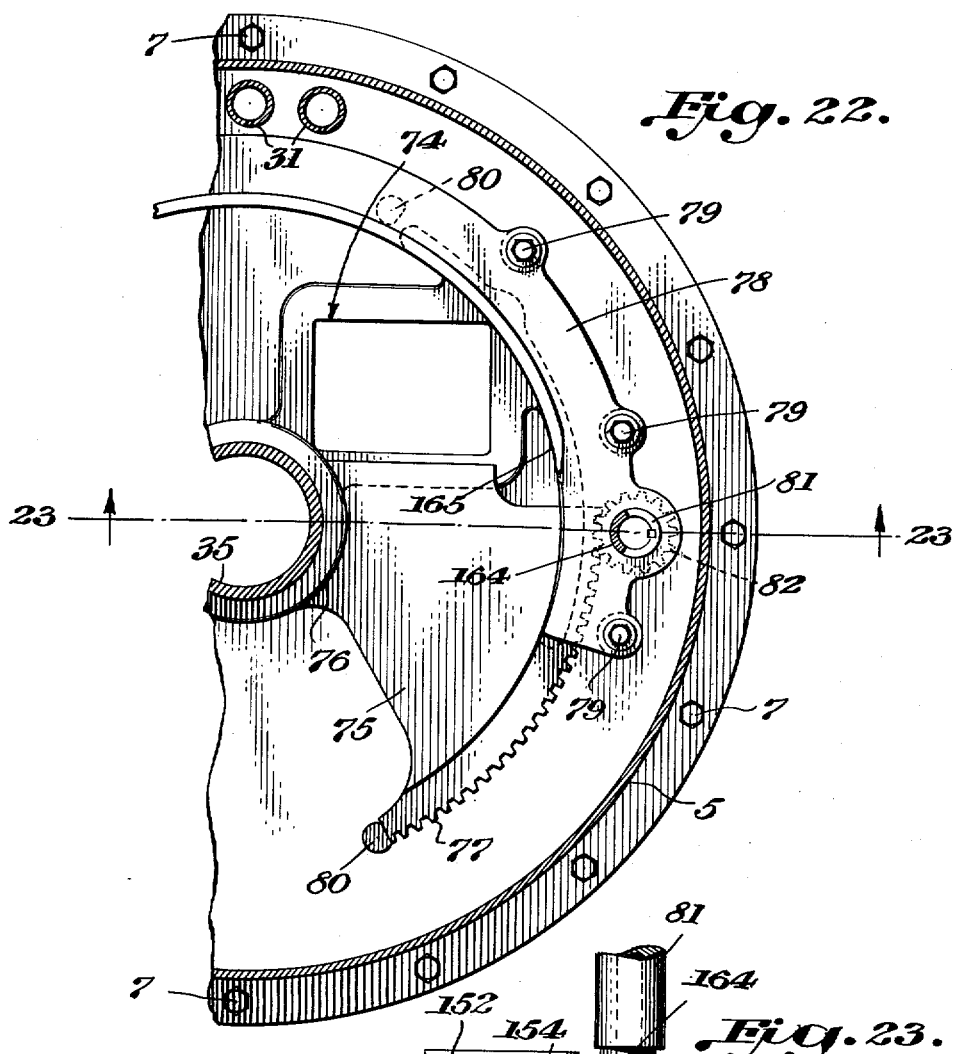
Figure 22 is a view similar to Figure 19 illustrating the shiftably mounted door at the discharge end of the retort.

The rack segments 77 are movable between limiting stops 80, the uppermost stop in each instance serving to limit movement of the rack at the door closing position, and the lowermost stop in each instance serving to fix the position of the respective door in the open position illustrated in each of Figures 19 and 22.

Figure 23:
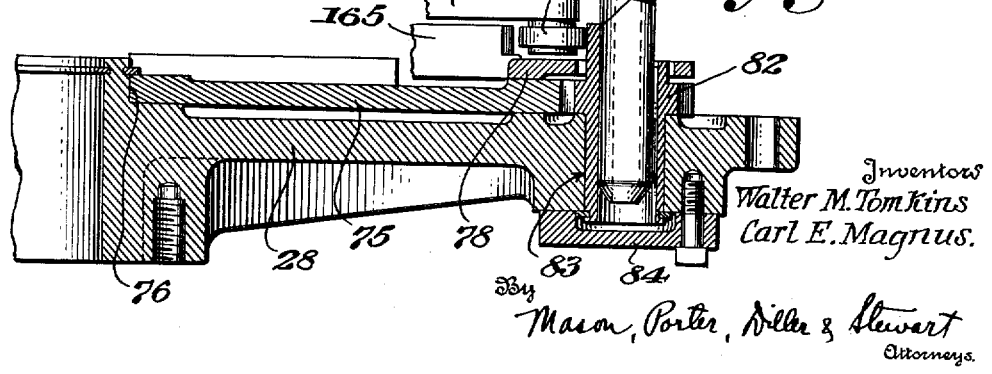
Figure 23 is a horizontal section taken on the line 23—23 on Figure 22.

The door position controlling means comprises a hollow shaft 81 extending the full length of and within the retort, and said shaft has a sleeve pinion 82 secured at one end thereof in position for meshing with the respective rack 77 in the manner clearly illustrated in Figure 23. The hub portion of the sleeve has rotative bearing as at 83 in the header 28, and it will be noted by reference to Figure 23 that a cap 84 removably attached to the header 28 closes over the end of the pinion sleeve and the control shaft end to which it is affixed.

It will be apparent by reference to Figure 20 that the control shaft 81 is provided at its other end with an extension piece which is secured in the end of the shaft and provided with a frusto-cone portion 85, and on said extension a pinion sleeve 86 is secured through the medium of a screw 87. The sleeve 86 has rotative bearing in the header 26 as at 88 and extends therethrough and has a hand wheel 89 secured thereon through the medium of which rotation may be imparted to the control shaft. The pinion portion 90 of the sleeve 86 meshes with the closure door rack segment 77, and it will be apparent that by rotating the hand wheel 89 it is possible to manipulate both doors so as to effect an opening or closing of the inlet and outlet openings 73 and 74. By utilizing the frusto-cone connection and the securing screw 87 it is a simple matter to properly line up the closure doors so that each will engage the proper limiting stop to definitely place both doors in either the open or closed position.

The means for effecting and controlling the manual indexing of the rotor and the mechanical or power driven rotation thereof is best illustrated in Figures 2, 3, 4, 15 and 16 of the drawings. By reference to Figure 15, it will be apparent that a large pulley 91 is key-secured upon the extended end of the shaft section 65, and the pulley is equipped with a friction cone clutch portion 92 and a single index position securing pin receiving recess 93.

The header extension 62 is supported on a base or pedestal 94 from which a bracket portion 95 projects in the manner clearly illustrated in Figures 3 and 4. Upon the bracket portion 95 is supported a base member 96 having parallel slide guides 97. The guides 97 provide a slide mounting for the slide members 98 projecting laterally from the gear housing 99 wherein a stepped shaft section 100 is rotatably mounted as at 101. A worm wheel 102 is keyed on the shaft section 100 and is adapted to be rotated by a worm gear 103 which meshes therewith and is keyed on a cross shaft 104 having rotative bearing as at 105 in the gear housing 99. A hand wheel 106 is secured upon the extended end of the shaft 104, and by manipulation thereof manual indexing of the rotor may be effected in a manner to be described hereinafter.

The shaft section 100 is equipped with a cone clutch head 107 flange secured thereon as at 108, and a centering pin 109 secured as at 110 to the shaft section 65, engages in a rotary and slide bearing 111 in the end of the shaft section 100 and serves to maintain the desired concentric relation of the cooperating cone clutch elements 92 and 107.

Attention is directed to Figures 2 and 4 of the drawings from which it will be apparent that the large pulley 91 is adapted to be driven through the belt 112 from the driver pulley 113 on the shaft of the driving motor 114. The motor 114 is adjustably supported as at 115 in variable speed drive relation to the large pulley on the bracket 116 which projects from the pedestal 94. It is to be understood that by adjusting the position of the motor closer to or more distant from the large pulley 91, it is possible to impart rotation to said large pulley and the can runway supporting rotor at variable speeds. It is intended that the rotor shall be driven at any selected speed from 40 R. P. M. to 100 R. P. M.

The gear housing 99 is provided with a pair of ears 117 projecting endwise therefrom and between which is mounted a bifurcated end 118 of a toggle link 119, said link being pivoted to the ears as at 120. The link 119 is pivoted as at 121 to a toggle link 122 which is in turn bifurcated at 123 to the upper end of a support member 124. The member 124 is pivotally supported at its lower end as at 125 on the base member 96 and is apertured to straddle the post 126 which is secured to the base member and equipped at its outer end with an abutment 127. A compression spring 128 interposed between the abutment 127 and the adjacent face of the support member 124 constantly tends to swing the support member 124 about its pivotal mounting 125 in a direction for moving the gear housing 99 toward the right as viewed in Figure 15, or in other words constantly tends to force the clutch member 107 into clutching or braking engagement with the clutch portion 92 on the large rotor driving pulley 91. The movement of the support member 124 under action of the spring 128 may be limited by the adjustable stop screw 129 which is mounted on the member 124 in position for engaging the base member 96.

A lever 130 extends upwardly from the toggle link 119, and a second lever 131 is pivotally mounted on the toggle pivot 120 and extends below the same where it is connected by a link 132 and clamp 133 with a locking detent or pin 134 which is slidably mounted in base member bearings 135 in position for being engageable in the pulley recess 93 for locking said pulley and the connected can supporting rotor in positions to which they have been manually indexed.

It will be apparent by reference to Figures 15, 17 and 18 that the locking pin 134 is provided in its undersurface with a deep recess or slot 136 and a shallower slot extension 137 in which to receive the reduced upper end portion 138 of a spring lifted plunger 139. The plunger 139 is vertically-slidably mounted in a bearing cylinder 140 supported on the base member 96, and it is to be understood that the plunger is cupped and provided with a bleed port disposed in the manner clearly illustrated in Figure 15 so that oil provided in the bottom of the cylinder bearing 140 will provide a dashpot action effective to retard and prevent too sudden down movement of the plunger 139. A longitudinally disposed, narrow slot 141 provided through the locking pin 134 receives the flattened lower end portion of a cushioning pin in the manner clearly illustrated in Figures 15, 17 and 18. The cushioning pin is uprightly disposed and guided in bearings 143 formed on a bearing member 144 which is attached to the base member 96, and at its upper end the cushioning pin contacts with the bottom of the end portion of the toggle link 119 adjacent its pivotal connection with the toggle link 122. If desired, a contact pad 145 may depend from the toggle link 119 for engagement with the cushioning pin 142 as shown in Figure 15.

A switch 146 is mounted as at 147 on the support member 124 and is electrically connected as at 148 with the rotor driving motor 114 and with the power source 149 through which said motor is driven. It will be apparent by reference to Figure 15 that the switch is so disposed as to be contacted by the end of the locking pin 134 when it is fully retracted from its index locking contact in the pulley recess 93. The switch is of the normally open type, and it will thus be apparent that only when the circuit is completed through the switch by engagement of the end of the locking pin 134 with the switch so as to close the contacts therein will the electrical circuit to the rotor driving motor be completed. Thus it is impossible to start the rotor driving motor inadvertently when the index locking pin 134 is in the pulley recess 93. In other words, unless the locking pin 134 is fully retracted, to contact and close the switch 147, the rotor driving motor 114 cannot be started.

In the illustration of Figure 15 the parts are shown in the clutch engaged position, as when it is intended to manually index the can supporting rotor. In this condition of the parts, the index locking pin 134 can be reciprocated freely by manipulation of the lever 131. By now swinging the lever 131 to the right as viewed in Figure 15, the pin 134 can be retracted from its locking contact in the pulley recess 93, and then by rotation of the hand wheel 106 rotation can be imparted to the stepped shaft 100, and through the engaging clutch portions 107 and 92, the shaft section 65, gear couple 64, 64 and shaft section 59 to the can supporting rotor. When the rotor has been indexed a proper amount to present the selected can receiving runway at the inlet door 73, the lever 131 will be swung to the left in order to again project the locking pin 134 into the locking recess 93 for the purpose of securing the position of the can supporting rotor. This manipulation of parts is repeated for each indexing of the can supporting rotor.

When it is desired to power drive the can supporting rotor, the lever 130 is pushed to the right as viewed in Figure 15. This causes the toggle links 119, 122 to break upwardly, and by thus reducing the spacing between the pivot pins 123 and 120, the gear housing 99 will be pulled to the left as viewed in Figure 15, along the slide guides 97 shown in Figure 16, and this movement of the gear housing will withdraw the cone clutch portion 107 from effective engagement with the cone clutch portion 92 of the rotor driving pulley 91. By now moving the lever 131 to the right, the detent locking pin 134 can be retracted from its effective locking position as before described, and it is to be noted by reference to Figure 15 that the levers 131 and 130 are disposed in the same vertical plane and so close one to the other that it is impossible to move the lever 130 forwardly so as to release the clutch member 107 without contacting the lever 131 and forcing the same forwardly in a manner for retracting the detent locking pin 134 from the locking recess 93. Thus the clutch cannot be released without withdrawing the index locking pin 134, and as before described, the can supporting rotor driving motor 114 cannot be started unless the locking pin 134 has been fully retracted.

The upward movement of the toggle link 119 frees the cushioning pin 142 and permits the upper end portion 138 of the plunger 139 to spring into the locking pin recess 136 in a manner for retaining the same in its retracted position and securing said pin against free manipulation at all times except when the clutch members are in effective engagement as shown in Figure 15. In other words, the plunger 139 holds the index locking pin 134 out of the locking recess 93 when the clutch elements are out of contact, and the locking pin may be operated freely when the clutch elements are effectively engaged, but not when they are disengaged.

When the clutch members are disengaged from the position shown in Figure 15, and the index locking pin 134 retracted in the manner above described, assuming that the end extremity of the locking pin is engaged with the safety switch 147 so as to close the same, the motor 114 may be started so as to impart the desired rotation to the can supporting rotor. The speed of rotation to be imparted to said rotor is controlled, as aforesaid, by adjusting the position of the driving motor 114 with relation to the driving pulley 91. After the rotation of the rotor has been continued over the desired processing interval, the operation of the driving motor 114 may be discontinued, and the lever 130 may be moved to the left to depress the toggle to the position illustrated in Figure 15, or in other words to straighten the links and again force the clutch elements 107 and 92 into effective engagement. The engagement of the clutch elements will serve to brake the rotation of the can supporting rotor and aid in bringing the same to a stop, and by reason of the engagement of the link 119 with the cushioning pin 142, and of the cushioning pin 142 with the dashpot plunger 139, downward movement of the plunger will be resisted by the bleeding of oil and the resulting dashpot action will prevent too sudden engagement of the clutching elements.

Figure 26:
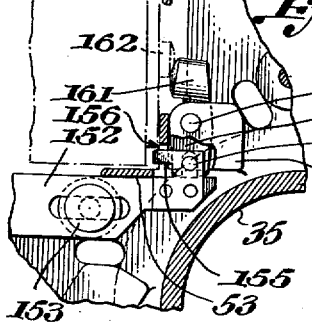
Figure 26 is an enlarged fragmentary cross sectional view illustrating one of the can stops as it is being projected through the adjacent rail slot into position for intercepting the cans in the associated runway.

In order to control the discharging of processed cans from the retort, and to provide stop means for limiting movement of the can rows at the discharge end of the retort, the hollow shaft 35 of the rotor has secured thereon a spider generally designated 150. The spider is shown in detail in Figures 24 to 27 from which it will be apparent that said spider includes a center hub portion secured on the shaft 35, and six outwardly extending arms 151. A stop carrier bar 152 is mounted by slot and pin connections 153 on each spider arm 151, and at its outer end each said bar is equipped with a roller 154. A can stop 155 is secured to the inner end of each bar 152 and is movable into and out of position for intercepting cans rolling along the respective runway through a clearance or slot 156 provided in the adjacent angle track 53 of the particular runway. See Figures 24 and 26.

Figure 24:
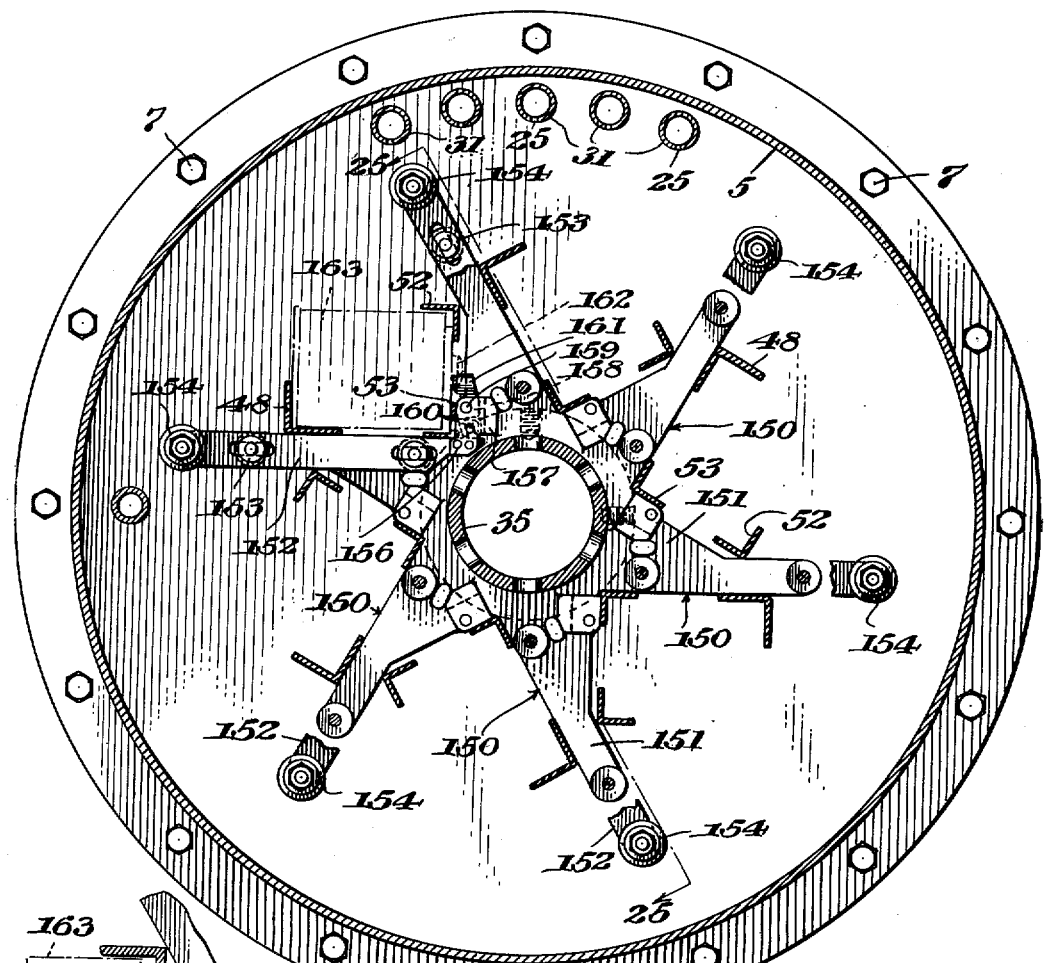
Figure 24 is a vertical cross section taken through the retort at the position of the spider which carries the automatically projected and retracted can stops.
Figure 27:
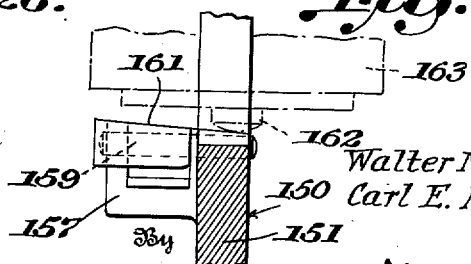
Figure 27 is a fragmentary horizontal section taken on the line 27—27 on Figure 25 and illustrating one of the stop re-setting members.

Adjacent each track slot 156 each spider arm 151 is equipped with a bearing enlargement 157 in which a stop re-setting member 158 is pivotally mounted as at 159. See Figures 25 and 27. Each re-setting member 158 has slot and pin connection as at 160 with the respective stop 155 and has a cam head 161 disposed as shown in Figures 24 and 27 in position for being displaced by a cam button 162 projecting from the end of a dummy can 163. It will be apparent that by moving a given stop actuator bar 152 inwardly along the spider arm 151 on which it is mounted, the connected stop 155 will be retracted through the track slot 156 out of position for being contacted by cans rolling along the respective runway. It will also be apparent that by displacing the cam head 161 inwardly, as by contact therewith of the cam button 162 of a passing dummy can 163, the re-setting member 158 will be moved to bring about a return of the actuator bar 152 to its outwardly projected position and a projection of the stop 155 through the slot 156 to replace the same in position for intercepting cans rolling along the runways. It will be apparent by reference to Figures 22 and 23 of the drawings that the previously described pinion sleeve 82 is equipped with a cam arc extension 164. Whenever the discharge door 75 is moved to the open position shown in Figure 22 the cam arc extension 164 will be brought into position for being contacted by the rollers 154 on the spider arms 151 as they are moved past said arc extension. Thus during the indexing of the rotor to effect a sequential discharge of the processed cans from the runways and the feeding in of new rows of cans to be processed onto said runways, as each spider arm 151 is indexed to the horizontal position shown at the left in Figure 21 its roller 154 will contact the stationary cam arc extension 164 to effect a releasing of the respective can stop 155 in the manner previously described so as to permit the row of processed cans lined up with the discharge opening 74 to run out through said opening. It is to be understood that the last real can in each runway supported row is followed by a dummy can 163 equipped with a stop re-setting cam button 162, and when each dummy can approaches the discharge door or opening 74 it will engage the re-setting cam head 161 in the manner previously described and effect a re-setting of the stop 155 so that the new row of cans fed onto the runway through the inlet door or opening 73 will be intercepted and held in the runway by said stop. The cam arc extension 164 is out of position for being contacted by the spider rollers 154 when the doors 75 are in position for closing the inlet and outlet openings 73 and 74.

In order to prevent movement of the stop actuator bars 152 in the stop releasing direction as they move about the upper half of their travel there is provided an arcuate fixed track 165 which may be supported by the adjacent guide 78 or otherwise in position for being engaged by the inner portions of the bar carried rollers 154. It is only necessary to extend the track through approximately 180 degrees since gravity action is sufficient to prevent movement of the bars 152 as they pass about the lower half of their path of travel. It will be observed by reference to Figure 2 that the track terminates opposite the cam arc extension 164 so as to avoid interference with the function of said extension in actuating the bars 152.

If desired, provision may be made for attaching thermocouples to selected cans on the rotor runways, and for this purpose, a plurality of connectors 166 may be mounted on the hollow shaft head 67 to extend radially therefrom through clearances in the hollow center shaft 35 of the rotor and into the interior of the retort. See Figures 13 and 28. These connectors may be connected by wires (not shown) with the suitably placed thermocouples (not shown). A hollow shaft extension 167 is attached to the previously described shaft section 69 and is equipped with wire passages 168 to permit wires (not shown) connected with the connectors 166 and passing through the hollow center portion of the shaft section 69 and extension 167 to pass through said extension and connect with peripherally grooved contact rings 169. The grooves in the rings 169 may receive weighted bare wires for the purpose of transmitting electrical impulses from the thermocouples to suitable measuring or recording instruments, (not shown). Removable cover equipped hand holes 170 may be provided at intervals along the retort casing sections 5 to facilitate the connecting of wires to the thermocouples in test cans, or for other purposes of access.

In order to facilitate the feeding of cans to and from the retort, means somewhat diagrammatically illustrated in Figures 2 and 3 may be provided. A can feeding chute or runway 171 equipped with a timing star wheel 172 may be mounted at the receiving end of the retort in position for feeding cans into the retort through the inlet opening 73. The timing star wheel may be driven through universal joint connections 173 from a drive shaft 174 extending along the side of the retort and in turn driven through a universal joint 175 from the driver shaft 176. The shaft 176 may be driven through a bevel gear couple 177 from a cross shaft 178 which is in turn driven through power transmitting connections 179 from a motor 180. The shaft 178 operates a timing star wheel 181 which may serve to receive cans running out through the discharge door 74 and time them onto a feed-away conveyor means generally designated 182.

It is believed the operation of the apparatus will be clearly understood after a reading of the foregoing description, but this operation will be briefly reviewed at this point.

Operation

Assuming an empty, shut down condition of the retort, the lever 130 will first be moved to the position shown in Figure 15 to bring about an engagement of the clutch elements 107 and 92, and the lever 131 will be manipulated to retract the locking pin 134. By now turning the hand wheel 106 the rotor may be indexed to present one of the can receiving runways in line with the inlet door 73. The doors 75 will be moved to the open position by turning of the hand wheel 89 and the motor 180 may be started to bring about a feeding of a row of cans onto the aligned runway under timing control of the timing star wheel 172. The cans will not pass out through the discharge door 74 because they will be intercepted by the stop 155.

The rotor will be indexed through successive steps by manipulation of the hand wheel 106 to serially present the can receiving runways in line with the inlet door 73, and each successively presented runway will be filled in the manner previously described. It will be recalled that at the end of each runway thus filled a dummy can having a stop resetting cam button 162 will be placed. It is also to be understood that the lever 131 is manipulated to place the locking pin 134 in the locking recess 93 following each indexing movement so as to securely lock the rotor against movement during the loading of each runway.

After all runways have been loaded, the doors 75 are closed by turning of the hand wheel 89 and the cooking process may be started, steam being directed into the retort through the several supply lines and orificed pipes to provide the desired cooking heat and pressure within the retort. The lever 130 is now moved to the right as viewed in Figure 15 to bring about a retraction of the clutch member 107. Movement of the lever 130 alone will also effect retraction of the detent locking pin 134 from the locking recess 93, or this may be accomplished by separate manipulation of the lever 131. Full retraction of the pin 134 will cause the end extremity of the pin to engage and close the switch 147. The rotor drive motor 114 may now be started and rotation will be imparted to the rotor at the proper selected speed throughout the whole processing of the cans.

After the cooking process has proceeded over the proper interval of time, cold water may be injected into the retort through the previously described supply lines and orificed pipes, and the water will serve to accelerate the cooling process. Simultaneously therewith, the steam may be replaced by directing air into the retort through the steam lines and orificed pipes. By gradually increasing the pressure of the air as the steam pressure within the retort decreases through cooling it is possible to maintain a proper pressure balance within the retort, and by this means buckling of the cans during the cooling period may be prevented. After the processing of the cans is completed, the lever 130 may be returned to the position shown in Figure 15 to bring about an engagement of the clutch elements 107 and 92 to cause a braking action and facilitate a stopping of the rotor. After the rotor is stopped the hand wheel 106 may be manipulated to line up one of the can supporting runways with the door openings 73 and 74, after which the index locking pin is inserted in the locking recess 93 by manipulation of the lever 131. The hand wheel may now be manipulated to swing the doors 75 to the open position illustrated in Figures 19 and 22.

As previously described, the manual indexing of the rotor into position for lining up one of the runways with the door openings 73 and 74 will bring about an engagement of the actuator roller 154 associated with the aligned runways with the cam arc extension 164. This cam extension contact results in a releasing of the particular can stop 155, and the row of cans on the aligned runway will be permitted to run out through the discharge door opening 74 under timing control of the timing star wheel 181. As the dummy can 163 at the end of the row runs past the re-setting member 158 it will bring about a re-setting of the can stop 155 into position for intercepting the cans fed onto the runway during the reloading thereof. The unloading and re-loading of the rotor runways is carried out in the manner stated following proper indexing of the rotor, and when the re-loading of the rotor is completed the process is repeated in the manner previously described.

It is preferred that the rotor driving pinion 64 which rotates with the large pulley having the single locking pin receiving recess 93 and which meshes with the large spur gear 63 shall bear a one to six ratio with said spur gear so that during each complete revolution of the large pulley 91 the can supporting rotor will be indexed one-sixth revolution. In other words, for each complete turn of the large pulley 91 effected by the manually operated indexing devices, the rotor will be indexed just far enough to displace one runway from alignment with the inlet door 73 and bring the next succeeding runway in line with said door. It will be apparent also that each such indexing movement of the large pulley 91 will return the locking recess 93 to position for again receiving the index locking pin 134.

As previously described, the spring 128 which constantly tends to move the clutch member 107 into clutching engagement when the toggle links are straightened is so adjusted as to apply just the right amount of pressure to the clutching element, and when the toggle is broken the spring is ineffective to impart movement to the clutch member because of the non-extended condition of the toggle links and the limiting engagement of the stop screw 129.

It will be apparent by reference to Figures 15 and 17 of the drawings that the deep slot 136 in the index locking pin 134 is so spaced with relation to the plunger extension 138 and the outer end extremity of the pin that the pin end can contact and close the rotor driving motor control switch 146 when said plunger extension is projected into said slot. However, said slot 136 is longer than the plunger extension 138 so as to provide a limited freedom for movement of the index locking pin when said extension 138 is projected thereinto sufficient to permit the positioning of the locking pin out of the locking recess 93 and also out of contact with the switch, if desired, thereby making it impossible to start the motor 114 without first properly manipulating the lever 131 to contact the locking pin with the switch 146. The compression spring which constantly urges the plunger 139 upwardly will be effective, whenever the toggle is broken and the pin 142 is thereby freed, to press the plunger against the locking pin and yieldably hold the same in positions to which it is moved.

While one form of the invention has been shown for purposes of illustration, it is to be clearly understood that various changes in the details of construction and arrangement of parts may be made without departing from the spirit and scope of the invention as defined in the appended claims.

We claim:

1. In apparatus for processing products in sealed cans wherein are provided spaces permitting movement of mobile contents, a retort in which to receive a heat exchanging medium, a rotor in the retort, means for applying continuous rotation to the rotor at a predetermined definite speed based upon the particular product being processed and about a generally horizontally disposed axis and for a selected processing period involving many complete rotations of the rotor, means on said rotor for supporting cans thereon with their longitudinal axes disposed transversely with respect to said axis of rotation and so spaced therefrom that said axis does not pass through any part of any can so supported, means for supplying cans to said supporting means prior to said processing period, and means for discharging cans from said supporting means after termination of said processing period.

2. In apparatus for processing products in sealed cans wherein are provided spaces permitting movement of mobile contents, a retort in which to receive a heat exchanging medium, a rotor in the retort, means for applying continuous rotation to the rotor about a generally horizontally disposed axis and at variable selected speeds to be determined by the product being processed, and means on said rotor for supporting cans thereon with their longitudinal axes disposed transversely with respect to said axis of rotation and so spaced therefrom that said axis does not pass through any part of any can so supported.

3. In apparatus for processing products in sealed cans wherein are provided spaces permitting movement of mobile contents, a retort, means for selectively directing cooking steam or cooling water into the retort, a rotor in the retort, means for applying continuous rotation to the rotor at a predetermined definite speed based upon the particular product being processed and about a generally horizontally disposed axis involving many complete rotations of the rotor, and means on said rotor for supporting cans thereon with their longitudinal axes disposed transversely with respect to said axis of rotation and so spaced therefrom that said axis does not pass through any part of any can so supported, means for supplying cans to said supporting means prior to the processing period, and means for discharging cans from said supporting means after termination of the processing period.

4. In apparatus for processing products in sealed cans wherein are provided spaces permitting movement of mobile contents, a retort, means for selectively directing cooking steam or pressure controlling air, and cooling water into the retort, a rotor in the retort, means for applying continuous rotation to the rotor at a predetermined definite speed based upon the particular product being processed and about a generally horizontally disposed axis involving many complete rotations of the rotor, and means on said rotor for supporting cans thereon with their longitudinal axes disposed transversely with respect to said axis of rotation and so spaced therefrom that said axis does not pass through any part of any can so supported, means for supplying cans to said supporting means prior to the processing period, and means for discharging cans from said supporting means after termination of the processing period.

5. In apparatus for processing products in sealed cans wherein are provided spaces permitting movement of mobile contents, a retort in which to receive a heat exchanging medium, a rotor in the retort, means for applying continuous rotation to the rotor at a predetermined definite speed based upon the particular product being processed about a generally horizontally disposed axis involving many complete rotations of the rotor, and means on said rotor for supporting cans in multiple rows on said rotor with each can in each row having its axis disposed transversely with respect to the axis of rotation and in tangential relation to an imaginary circle concentric to said rotation axis.

6. In apparatus for processing products in sealed cans, a retort in which to receive a heat exchanging medium, a rotor disposed in the retort with its axis in a generally horizontal inclined position, means for applying continuous rotation to the rotor, a plurality of can supporting runways on said rotor for rollably supporting can rows thereon with the axes of the cans disposed transversely with respect to the axis of the rotor, an inlet doorway at one end of the retort and a discharge doorway at the other end of the retort, a door associated with each doorway and shiftable for opening or closing the same, door shifting devices operatively connected with both doors, means operable independently of said rotor rotating means at one end of the retort for actuating said door shifting devices for shifting both doors, and means operable at said one end of the retort for indexing the rotor to serially present the runways at the doorways and permit the running of cans onto and from said runways through said doorways.

7. In apparatus for processing products in sealed cans, a retort in which to receive a heat exchanging medium, a rotor disposed in the retort with its axis in a generally horizontal inclined position, power driven means for applying continuous rotation to the rotor, a plurality of can supporting runways on said rotor for rollably supporting can rows thereon with the axes of the cans disposed transversely with respect to the axis of the rotor, an inlet doorway at one end of the retort and a discharge doorway at the other end of the retort, and means other than said rotor rotating means for presenting the runways serially at said doorways to permit the running of cans onto and from said runways, each said runway being so placed that each can supported thereon will have its axis disposed transversely with respect to the axis of rotation and in tangential relation to an imaginary circle concentric to said rotation axis.

8. In apparatus for processing products in sealed cans, a retort in which to receive a heat exchanging medium, a rotor disposed in the retort with its axis in a generally horizontal inclined position, means for applying continuous rotation to the rotor, a plurality of can supporting runways on said rotor for rollably supporting can rows thereon with the axes of the cans disposed transversely with respect to the axis of the rotor, an inlet doorway at one end of the retort and a discharge doorway at the other end of the retort, a door associated with each doorway and shiftable for opening or closing the same, door shifting devices operatively connected with both doors, means operable independently of said rotor rotating means at one end of the retort for actuating said door shifting devices for shifting both doors, and means operable at said one end of the retort for indexing the rotor to serially present the runways at the doorways and permit the running of cans onto and from said runways, each of said door shifting devices actuating means and rotor indexing means being manually operable, and said rotor rotating means being power driven.

9. In apparatus for processing products in sealed cans, a retort in which to receive a heat exchanging medium, a rotor disposed in the retort with its axis in a generally horizontal inclined position, means for applying continuous rotation to the rotor, a plurality of can supporting runways on said rotor for rollably supporting can rows thereon with the axes of the cans disposed transversely with respect to the axis of the rotor, an inlet doorway at one end of the retort and a discharge doorway at the other end of the retort, a door associated with each doorway and shiftable for opening or closing the same, door shifting devices operatively connected with both doors, means operable independently of said rotor rotating means at one end of the retort for actuating said door shifting devices for shifting both doors, and means operable at said one end of the retort for indexing the rotor to serially present the runways at the doorways and permit the running of cans onto and from said runways, said rotor rotating means being power driven, and said rotor indexing means being manually operable and including a manually shiftable friction clutch forming a part of a rotor indexing couple and also being operable while the rotor is still in rotation as a brake means to aid in bringing the power driven rotor to a stop.

10. In apparatus of the character described, a can supporting rotor having at least one can row supporting runway thereon extending in the direction of the length of the rotor and composed of three angle tracks, one of said tracks being fixed and the remaining two being laterally-adjustably mounted with relation to said one track to adapt the runway for receiving cans of different heights and diameters.

11. In apparatus of the character described, a can supporting rotor having at least one can row supporting runway thereon extending in the direction of the length of the rotor and composed of three angle tracks disposed to rollably support the cans in row relation with the axis of each can disposed transversely with respect to the axis of rotation of the rotor and in tangential relation to an imaginary circle concentric to the rotor axis.

12. In apparatus of the character described, a retort composed of an end header at each end, at least one connector member, and casing sections between and secured at their ends to said headers and connector member; a rotor rotatable in the retort and comprising a center shaft, a supporting ring equipped spider means mounted on the shaft within each connector, a plurality of intermediate spiders mounted on the shaft between the ring equipped spider means and the end headers, can supporting runways extending lengthwise of the retort and parallel said shaft and mounted on said intermediate spiders; and roller means mounted on the connector member and engaged by the ring of the ring equipped spider means for supporting the rotor intermediately of its ends.

13. In apparatus of the character described, a retort composed of an end header at each end, at least one connector member, and casing sections between and secured at their ends to said headers and connector member; a rotor rotatable in the retort and comprising a center shaft, a plurality of spiders mounted on the shaft, can supporting runways extending lengthwise of the retort and parallel said shaft and mounted on said spiders, each said header and connector member having a manifold thereon from which a plurality of orificed pipes extend along the rotor to distribute a heat exchanging medium thereover, and means for supplying a heat exchanging medium to each said manifold.

14. In apparatus of the character described, a retort composed of an end header at each end, at least one connector member, and casing sections between and secured at their ends to said headers and connector member; a rotor rotatable in the retort and comprising a center shaft, a plurality of spiders mounted on the shaft, can supporting runways extending lengthwise of the retort and parallel said shaft and mounted on said spiders, each said header and connector having two manifolds thereon from each of which a plurality of orificed pipes extend along the rotor to distribute a heat exchanging medium thereover, and means for selectively directing cooking steam or pressure controlling air, and cooling water into said manifolds.

15. In apparatus for processing products in sealed cans, a retort in which to receive a heat exchanging medium, a rotor disposed in the retort with its axis in a generally horizontal inclined position, means for rotating the rotor, a plurality of can supporting runways on said rotor for rollably supporting can rows thereon with the axes of the cans disposed transversely with respect to the axis of the rotor, an inlet doorway at one end of the retort and a discharge doorway at the other end of the retort, means for presenting the runways serially at said doorways to permit the running of cans onto and from said runways, stop means on each runway for securing the can rows against rolling off the runways and shiftable between an effective can stopping position and a retracted ineffective position, and means operable as each respective runway is indexed to the discharge doorway for retracting the respective stop means.

16. In apparatus for processing products in sealed cans, a retort in which to receive a heat exchanging medium, a rotor disposed in the retort with its axis in a generally horizontal inclined position, means for rotating the rotor, a plurality of can supporting runways on said rotor for rollably supporting can rows thereon with the axes of the cans disposed transversely with respect to the axis of the rotor, an inlet doorway at one end of the retort and a discharge doorway at the other end of the retort, means for presenting the runways serially at said doorways to permit the running of cans onto and from said runways, stop means on each runway for securing the can rows against rolling off the runways, means for releasing each stop means when it is desired to discharge the row of cans from the particular runway, and means for automatically re-setting each stop means as the discharging of the particular row of cans is being completed.

17. In apparatus for processing products in sealed cans, a retort in which to receive a heat exchanging medium, a rotor disposed in the retort with its axis in a generally horizontal inclined position, means for rotating the rotor, a plurality of can supporting runways on said rotor for rollably supporting can rows thereon with the axes of the cans disposed transversely with respect to the axis of the rotor, an inlet doorway at one end of the retort and a discharge doorway at the other end of the retort, means for presenting the runways serially at said doorways to permit the running of cans onto and from said runways, stop means on each runway for securing the can rows against rolling off the runways, means for releasing each stop means when it is desired to discharge the row of cans from the particular runway, and means movable along each runway after the last can of the particular row has passed the associated stop means for automatically re-setting said stop means in position for intercepting cans subsequently rolling along the particular runway.

18. Apparatus as defined in claim 6 in which there are included on each runway stop means for securing the can rows against rolling off the runways, and means operable only after the discharge door has been shifted to the open position and incidental to the indexing of a runway into line with the discharge doorway for releasing the particular stop means and permitting the rolling of cans from the aligned runway through the discharge doorway.

19. Apparatus as defined in claim 6 in which there is included on the rotor a spider disposed adjacent the discharge end of the retort and having outwardly extending arms corresponding in number to the number of runways, each said arm having a stop bar shiftable thereon and carrying a stop adapted to project across an associated runway to intercept cans when the bar is moved outwardly and to free the cans to roll off the runway when the bar is moved inwardly, there also being included a stop shifting cam movable out of effective position each time the doors are shifted to the closed position and into effective position each time the doors are shifted to the open position to be engaged by each stop bar as the rotor is indexed to align a runway with the doors so as to shift the associated stop out of its can intercepting position.

20. Apparatus as defined in claim 6 in which there are included on each runway stop means for securing the can rows against rolling off the runways, means operable only after the discharge door has been shifted to the open position and incidental to the indexing of a runway into line with the discharge doorway for releasing the particular stop means and permitting the rolling of cans from the aligned runway through the discharge doorway, and means movable along each runway after the last can of the particular row has passed the associated stop means for automatically re-setting said stop means in position for intercepting cans subsequently rolling along the particular runway.

21. Apparatus as defined in claim 6 in which there is included on the rotor a spider disposed adjacent the discharge end of the retort and having outwardly extending arms corresponding in number to the number of runways, each said arm having a stop bar shiftable thereon and carrying a stop adapted to project across an associated runway to intercept cans when the bar is moved outwardly and to free the cans to roll off the runway when the bar is moved inwardly, there also being included a stop shifting cam movable out of effective position each time the doors are shifted to the closed position and into effective position each time the doors are shifted to the open position to be engaged by each stop bar as the rotor is indexed to align a runway with the doors so as to shift the associated stop out of its can intercepting position, means effective during at least part of each rotation of the rotor to hold the stop bars in the stop set positions, a stop resetting means on each runway and connected with the particular stop bar, and means movable along each runway after the last can of the particular row has passed the associated stop for engaging the particular stop re-setting means in a manner for shifting the particular stop bar and re-setting the associated stop means.

22. In apparatus for processing products in sealed cans, a retort in which to receive a heat exchanging medium, a rotor disposed in the retort with its axis in a generally horizontal inclined position, means for rotating the rotor, a plurality of can supporting runways on said rotor for rollably supporting can rows thereon with the axes of the cans disposed transversely with respect to the axis of the rotor, an inlet doorway at one end of the retort and a discharge doorway at the other end of the retort, means for presenting the runways serially at said doorways to permit the running of cans onto and from said runways, said rotor rotating means being power driven by means including an electric motor, means including a shiftable locking pin for securing the rotor in positions in which selected runways are presented at the doorways, and means preventing operation of the motor unless the locking pin is fully retracted.

23. In apparatus for processing products in sealed cans, a retort in which to receive a heat exchanging medium, a rotor within said retort, can supporting runways on said rotor, said retort having a doorway with which said runways are at times aligned for the feeding of cans, power driven means for imparting continuous rotation to the rotor and including a rotary element, a first friction clutch member mounted for movement with said rotary element, and rotor indexing means including a second friction clutch member, means for moving said second clutch member axially to engage and disengage the first clutch member, and manually operable means for rotating said second clutch member.

24. Apparatus as defined in claim 23 in which the rotary element includes an index locking recess, and in which are included a shiftable lock pin engageable in said recess to secure the rotor at indexed positions in which selected runways and the doorway line up, and means for shifting said lock pin.

25. Apparatus as defined in claim 23 in which the rotary element includes an index locking recess, and in which are included a shiftable lock pin engageable in said recess to secure the rotor at indexed positions in which selected runways and the doorway line up, means for shifting said lock pin, and means preventing application of power to the rotor rotating means unless the locking pin is fully retracted.

26. Apparatus as defined in claim 23 in which the rotary element includes an index locking recess, and in which are included a shiftable lock pin engageable in said recess to secure the rotor at indexed positions in which selected runways and the doorway line up, means for shifting said lock pin, said locking pin being freely shiftable when the clutch members are engaged, and there being included also means for securing the locking pin against movement into the locking recess whenever the clutch members are disengaged.

27. Apparatus as defined in claim 23 in which the rotary element includes an index locking recess, and in which are included a shiftable lock pin engageable in said recess to secure the rotor at indexed positions in which selected runways and the doorway line up, means for shifting said lock pin, the means for moving the second clutch member and the means for shifting the lock pin being so constructed and arranged that movement of the former in bringing about disengagement of the clutch members will automatically cause a movement of the latter to effect a retraction of the lock pin.

28. Apparatus as defined in claim 23 in which the clutch rotating means includes a shaft on which the second clutch member is mounted, a worm wheel on said shaft, a cross shaft having a hand wheel thereon and a worm gear meshing with the worm wheel, said shafts being rotatably supported on a slidably mounted support, and in which the second clutch moving means comprises toggle links attached to said slidable support and effective to project the slidable support to engage the clutch members when the toggle is straightened and to retract the slidable support and disengage the clutch members when the toggle is broken, and there is included a lever operable to straighten or break the toggle.

29. Apparatus as defined in claim 23 in which the clutch rotating means includes a shaft on which the second clutch member is mounted, a worm wheel on said shaft, a cross shaft having a hand wheel thereon and a worm gear meshing with the worm wheel, said shafts being rotatably supported on a slidably mounted support, and in which the second clutch moving means comprises toggle links attached to said slidable support and effective to project the slidable support to engage the clutch members when the toggle is straightened and to retract the slidable support and disengage the clutch members when the toggle is broken, and there is included a lever operable to straighten or break the toggle, and means for cushioning the straightening of the toggle so as to prevent too sudden engagement of the clutch members.

30. Apparatus as defined in claim 23 in which the clutch rotating means includes a shaft on which the second clutch member is mounted, a worm wheel on said shaft, a cross shaft having a hand wheel thereon and a worm gear meshing with the worm wheel, said shafts being rotatably supported on a slidably mounted support, and in which the second clutch moving means comprises toggle links attached to said slidable support and effective to project the slidable support to engage the clutch members when the toggle is straightened and to retract the slidable support and disengage the clutch members when the toggle is broken, and there is included a lever operable to straighten or break the toggle, said toggle links also being connected to a movable support, spring means constantly tending to move said links when straightened to press the clutch members together, and means for limiting the spring urged movement of said movable support.

31. Apparatus as defined in claim 23 in which the clutch rotating means includes a shaft on which the second clutch member is mounted, a worm wheel on said shaft, a cross shaft having a hand wheel thereon and a worm gear meshing with the worm wheel, said shafts being rotatably supported on a slidably mounted support, and in which the second clutch moving means comprises toggle links attached to said slidable support and effective to project the slidable support to engage the clutch members when the toggle is straightened and to retract the slidable support and disengage the clutch members when the toggle is broken, there being also included a lever operable to straighten or break the toggle, said rotary element including an index locking recess, a shiftable lock pin having a securing recess therein and being engageable in said rotary element recess to secure the rotor at indexed positions in which selected runways and the doorway line up, means for shifting said lock pin, a dash pot detent plunger spring urged toward the lock pin to engage in its securing recess, and a displacer pin engaging between the toggle links and said plunger and effective to cooperate with the plunger to release the same from the lock pin securing recess when the toggle is straightened and to cushion said straightening, and to free said plunger to engage in the lock pin recess when the toggle is broken to disengage the clutch members, thereby to secure the lock pin retracted position, the toggle lever and the lock pin shifting means being so constructed and arranged that the movement of the lever to break the toggle will automatically effect a retraction of the lock pin from the rotary element recess.

32. In apparatus of the character described, a retort in which to receive a heat exchanging medium, a rotor having can supporting runways thereon and including a hollow shaft portion extending from a position within the retort to a point without the retort at one end thereof, and means for enabling the connection of thermocouples for testing processing conditions within the retort and cans therein and comprising a plurality of connectors attached to the hollow shaft portion within the retort and each having a portion extending outwardly from said shaft and a portion extending inwardly into the hollow of said shaft, both said connector portions being adapted for connection with test wires, and contact rings mounted on the shaft portion externally of the retort for engagement by wire connectors leading to a suitable testing means, said rings having means thereon for connection with wires within the hollow of the shaft, said shaft having passages therethrough for enabling connection with said rings of wires within the hollow of said shaft.

33. In apparatus for processing products in sealed cans, a retort in which to receive a heat exchanging medium, a rotor disposed in the retort with its axis in a generally horizontal inclined position, means for rotating the rotor, a plurality of can supporting runways on said rotor for rollably supporting can rows thereon with the axes of the cans disposed transversely with respect to the axis of the rotor, an inlet doorway at one end of the retort and a discharge doorway at the other end of the retort, a shiftable door movable to and from the discharge doorway for alternately closing and opening the same, means for presenting the runways serially at said doorways to permit the running of cans onto and from said runways, stop means on each runway for securing the can rows against rolling off the runways and shiftable between an effective can stopping position and a retracted ineffective position, stop retracting means operatively connected with each stop means, and a stop retracting means actuator movable into effective position as the door is opened and out of effective position as the door is closed and engageable when in its effective position by each stop retracting means as the respective runway is being presented at the discharge door to retract the respective stop means as the respective runway is coming to rest at the discharge doorway.

WALTER M. TOMKINS.
CARL E. MAGNUS.

REFERENCES CITED

The following references are of record in the file of this patent:

UNITED STATES PATENTS

| Number | Name | Date |
| --- | --- | --- |
| 783,352 | Baker | Feb. 21, 1905 |
| 891,280 | Morgan | June 23, 1908 |
| 1,275,040 | Johnson | Aug. 6, 1918 |
| 1,485,851 | Hepper | Mar. 4, 1924 |
| 1,569,601 | Anderson | Jan. 12, 1926 |
| 2,341,099 | Hellman | Feb. 8, 1944 |